United States Patent

Makino et al.

Patent Number: 5,146,378
Date of Patent: Sep. 8, 1992

[54] MULTI-TRACK HEAD

[75] Inventors: Kenji Makino; Tohoru Matuda; Shinichi Inoue, all of Kanagawa; Fujihiro Itoh, Saitama; Yutaka Kusano, Kanagawa, all of Japan

[73] Assignee: Canon Kabushiki Kaisha, Tokyo, Japan

[21] Appl. No.: 806,858

[22] Filed: Dec. 9, 1991

Related U.S. Application Data

[63] Continuation of Ser. No. 416,029, Oct. 2, 1989, abandoned.

[30] Foreign Application Priority Data

Oct. 6, 1988 [JP] Japan .................. 63-250940

[51] Int. Cl.$^5$ ................... G11B 5/265; G11B 5/29
[52] U.S. Cl. ..................... 360/121; 360/122; 360/110
[58] Field of Search ............. 360/110, 121, 122, 119

[56] References Cited

U.S. PATENT DOCUMENTS

| 4,669,016 | 5/1987 | Schmid et al. | 360/122 |
| 4,717,979 | 1/1988 | Washisu | 360/121 |
| 4,809,110 | 2/1989 | Hertrich | 360/122 |
| 4,910,629 | 3/1990 | Mitsuhashi et al. | 360/121 |

FOREIGN PATENT DOCUMENTS

| 63-225909 | 9/1988 | Japan | 360/122 |
| 1116909 | 5/1989 | Japan | 360/122 |
| 1179212 | 7/1989 | Japan | 360/121 |

Primary Examiner—Aristotelis Pallos
Assistant Examiner—Alfonso Garcia
Attorney, Agent, or Firm—Robin, Blecker, Daley & Driscoll

[57] ABSTRACT

A multi-track magnetic head having at least three conversion elements deposited on a common substrate includes a medium sliding face which is formed in a curved shape. The positions of at least two of the three conversion elements are shifted from each other perpendicularly to the alignment direction of the conversion elements in conformity to the curvature of the medium sliding face.

5 Claims, 4 Drawing Sheets

MULTI-TRACK HEAD

This is a continuation application under 37 CFR 1.62 of prior application Ser. No. 416,029, filed Oct. 2, 1989, now abandoned.

BACKGROUND OF THE INVENTION

1. Field of the Invention

This invention relates to a multi-track head and more particularly to a multi-track head having at least three conversion elements formed on a common substrate.

2. Description of the Related Art

The thin-film magnetic head is manufactured by a thin-film deposition method and photo-lithography like the manufacturing process for the semiconductor IC. The head is small in size, light in weight and suited for mass production. In addition to these merits, it permits easy construction of a multi-track head which has many magnetic gaps integrated within one and the same head chip.

It is now expected that a multi-track thin-film head having more than 20 magnetic gaps integrated at a pitch of 80 μm will become practicable, for example, for a digital audio tape (DAT for short) recorder which performs magnetic recording and reproduction by converting an audio signal into a digital signal. For a magnetic tape device which is used as the external storage device of a computer system, a thin-film magnetic head of 18 tracks has already been developed. A magnetic tape measuring 0.15 to 0.5 inches in width is used as a recording medium for these magnetic tape recorders. FIG. 1 of the accompanying drawings shows a typical structural arrangement of the multi-track, thin-film tape recorder.

FIG. 1 shows the head as having an n number of magnetic gaps with the middle part of the head omitted from the illustration. A reference numeral 1 denotes the substrate of the head. In this case the substrate is made of a magnetic material. There are provided an n number of magneto-electric/electro-magnetic conversion elements E1 to En (hereinafter referred to simply as conversion elements). Each of these elements is composed of an upper magnetic core 4 which is arranged to form a magnetic gap between the substrate 1 and the core and a coil 5 which is made of a thin metal film. The conversion elements which are disposed on the substrate 1 are covered with a reinforcement plate 2 which is made of a ceramic material and is indicated by broken lines.

Referring further to FIG. 1, each of the magnetic gaps 3 which is formed between the substrate 1 and the upper magnetic core 4 has a gap depth 6 extending from a sliding face 10 shown in the upper part of the drawing. To ensure adequate contact of the conversion elements E1 to En with the magnetic tape, the sliding face 10 is formed linearly in the direction Y of the conversion element alignment (in the direction of track width) and to be in a smooth approximately cylindrical surface in the traveling direction X (or X') of the tape.

The conversion elements are aligned in the direction Y. Therefore, the gap depth 6 is uniformly obtained for all the elements.

As for the magnetic recording medium, a floppy disc or the like having a circular disc shape has recently come to be used as well as the tape. For the recording medium of the disc type, the thin-film, multi-track head is arranged as shown in FIG. 2.

FIG. 2 shows the structural arrangement of a thin-film magnetic head of a two track type for use in an electronic still camera. In FIG. 2, the multi-track thin-film head 7 has two conversion elements aligned perpendicular to the surface of the paper as viewed on the drawing. Magnetic recording or reproduction is performed with the head allowed to slide over a magnetic disc 9 which is driven to rotate in the direction of arrow X. In performing the magnetic recording or reproduction, the magnetic disc is sandwiched in between the magnetic head 7 and a pad 8. The pad 8 is provided for the purpose of suppressing the rotatory vibrations of the magnetic disc 9. The pad 8 has a recessed part 8a formed on one side opposed to the magnetic head 7. The sliding face of the magnetic head 7 is arranged to slightly protrude inside the recessed part 8a. The arrangement is such that the head 7 can be brought into adequate contact with the magnetic disc 9 by utilizing air pressure developed within the recessed part 8a in conjunction with the elasticity of the magnetic disc 9. The external shape of the magnetic head 7 of FIG. 2 is as shown in FIG. 3.

In FIG. 3, a reference numeral 1 denotes a substrate like that shown in FIG. 1. Although they are not shown, conversion elements for two tracks are arranged on this substrate 1 in about the same manner as in the case of FIG. 1. The conversion elements are covered with a reinforcement plate 2. The sliding faces 10 of the substrate 1 and the reinforcement plate 2 are curved both in the direction Y of the track width and the traveling direction X of the recording medium, that is, they are formed in a spherical (convex) shape. This is because the magnetic disc deforms in both the track-width direction (arrow Y) and the traveling direction (arrow X) of the disc. Generally, in the case of the head of FIG. 3, the contact of the head with the disc (hereinafter will be called "head touch") can be adequately obtained for the two tracks with the curved surfaces symmetrically formed both in the directions of arrows X and Y. The radius of the curved surface is generally set at 5 to 20 mm although it depends on the shape of the pad 8.

The multi-track thin-film head for a magnetic disc of the type as shown in FIGS. 2 and 3 is generally arranged for two tracks. However, to meet a recently increased demand for a higher image quality, the amount of information to be handled by the head of the electronic still video cameras or the like is trending upward. A demand for a higher speed is naturally also increasing for transmission of recording and reproduced signals. This tendency is seen not only in the field of image processing apparatuses but also in the case of external memory devices of computers.

The amount of information handleable by the apparatus of the kind using a magnetic disc can be increased by increasing the number of channels also in accordance with such a structural arrangement as the one shown in FIG. 1. However, the use of a rotating medium such as a magnetic disc as in the case of FIGS. 2 and 3 necessitates the sliding face to be formed in a shape curved also in the direction of track width. This presents no serious problem so long as the number of tracks does not exceed two or thereabout as in the past. However, in order to have a greater number of channels (tracks), there arises the following problem:

For example, assuming that the head is provided with many (n number of) conversion elements E1 to En as shown in FIG. 1 and that the head is machined to have the curved face also in the direction of track width as shown in FIG. 3, if these elements E1 to En are aligned in the same manner as shown in FIG. 1, the gap depth 6 increases in the middle part of the head and decreases accordingly as it is nearer to the end part of the head. The magnetic field generating efficiency of the head depends on the size of the gap depth. The efficiency becomes lower for the middle track than for peripheral tracks. Besides, thickness of the magnetic core of the thin-film magnetic head is only between a value less than 1 $\mu$m and scores of $\mu$m. Therefore, in order to ensure a sufficient degree of head efficiency, the gap depth must be within a range from a value less than 1 $\mu$m to 10 $\mu$m at the most. The machining precision required is in the order of 1 $\mu$m or less. The characteristic of the head is greatly affected even by a slight deviation from the required dimension.

SUMMARY OF THE INVENTION

This invention is directed to the solution of the above-stated problems.

It is therefore an object of the invention to provide a multi-track head having at least three conversion elements which ensures an adequate head touch for every one of the conversion elements and a uniform electromagnetic conversion characteristic of these elements.

Under this object, a multi-track head which is arranged in one mode of embodiment of the invention comprises: a substrate having a sliding face for sliding over a recording medium; and an n number of conversion elements arranged in alignment on the substrate, "n" being an integer which is at least 3, the sliding face being formed in a curved shape, the n number of conversion elements having their positions shifted from each other perpendicularly to the direction of their alignment along and conforming to the curve of the sliding face.

The above and other objects and features of the invention will become apparent from the following detailed description of embodiments thereof taken in connection with the accompanying drawings.

DETAILED DESCRIPTION OF THE PREFERRED EMBODIMENTS

Figure 1:
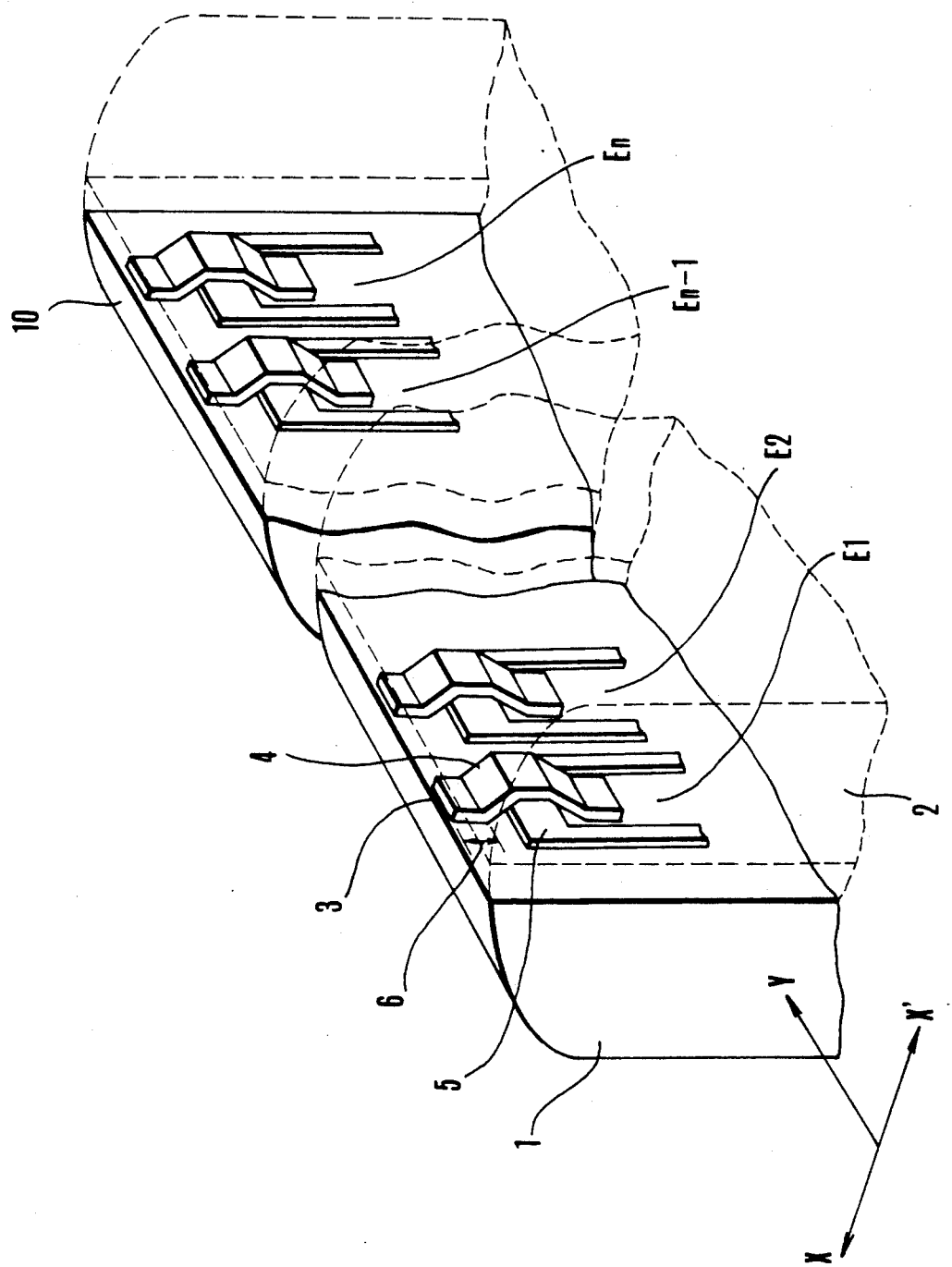
FIG. 1 is an oblique view showing the generic structural arrangement of the conventional multi-track thin-film magnetic head.
Figure 2:
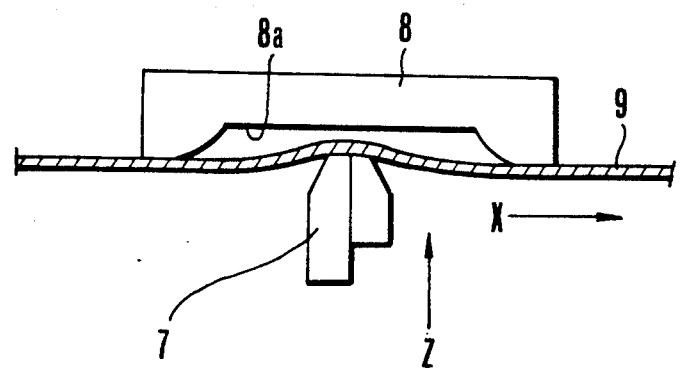
FIG. 2 shows the conventional magnetic disc recording device using a two-track thin-film magnetic head.
Figure 3:
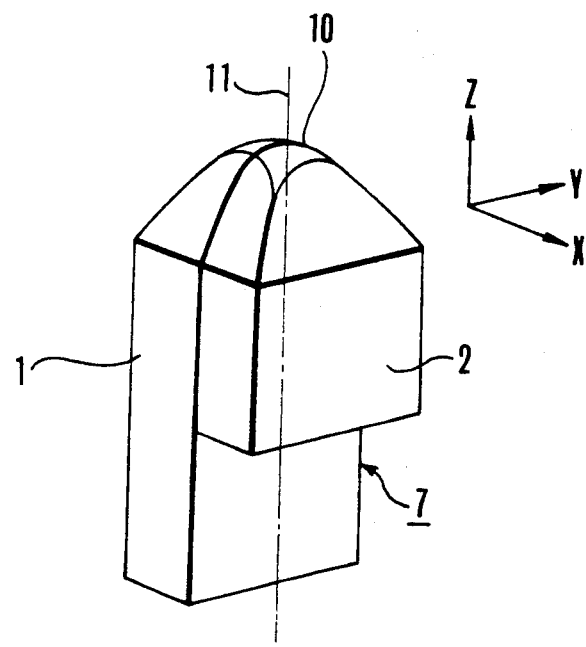
FIG. 3 shows the outside shape of the two-track thin-film magnetic head of FIG. 2.
Figure 4:
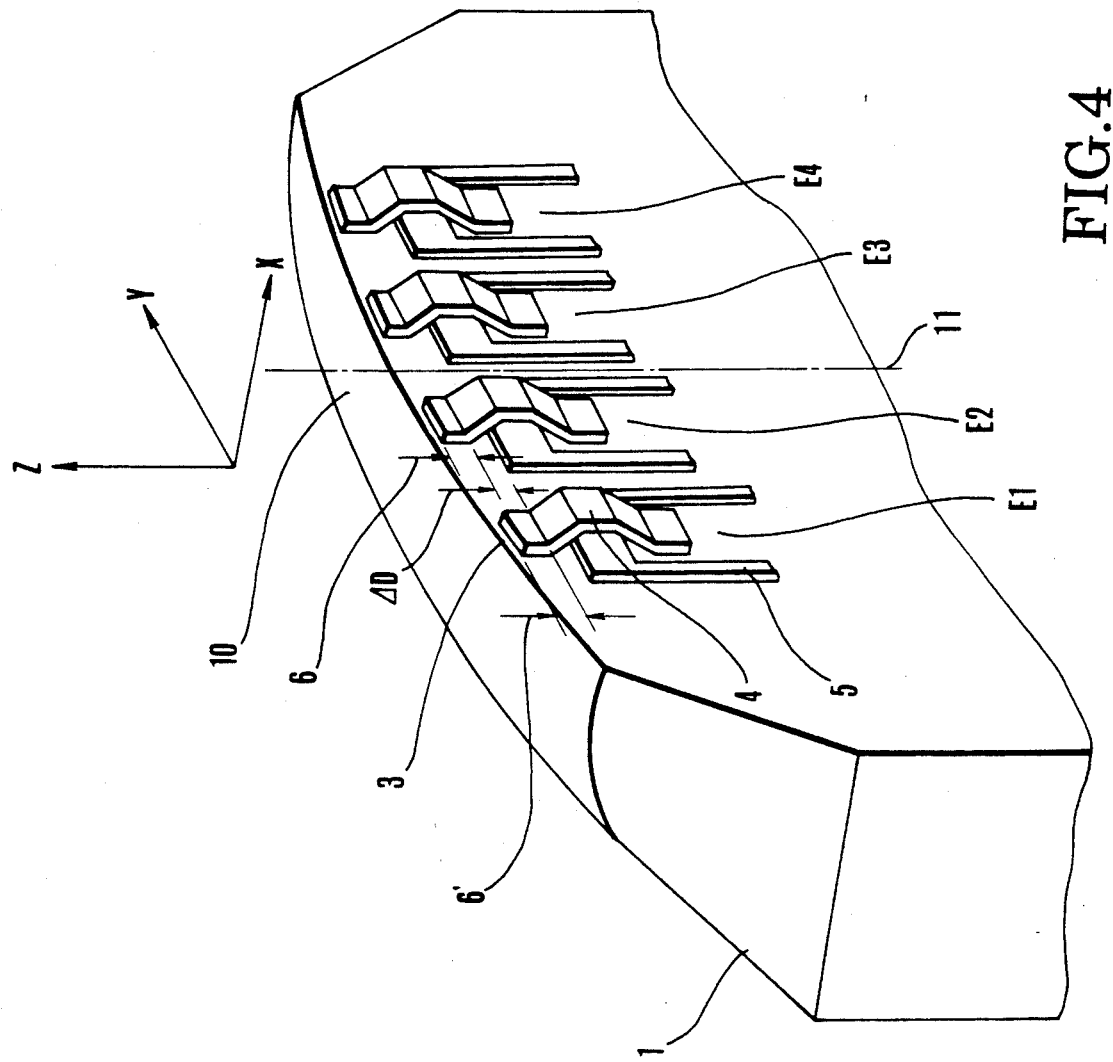
FIG. 4 is an oblique view showing the structural arrangement of a multi-track thin-film magnetic head which is arranged as an embodiment of this invention.

The details of this invention will be understood from the following description of embodiments thereof with reference to the accompanying drawings:

FIG. 4 shows the structural arrangement of a multi-track thin-film magnetic head which uses a rotating recording medium such as a magnetic disc and is arranged according to this invention as an embodiment thereof. The head has four conversion elements E1 to E4.

Referring to FIG. 4, a magnetic substrate 1 is made of a Mn-Zn or NI-Zn ferrite material. Coils (coil patterns) 5 which are made of thin metal film are disposed on the substrate 1 through an insulation layer which is not shown. On the substrate 1 are also disposed conversion elements E1 to E4. Each of the elements has an upper magnetic core 4. Magnetic gaps 3 are formed between the magnetic substrate 1 and the upper magnetic cores 4.

The structural arrangement of the conversion elements E1 to E4 is exactly the same as the conventional conversion element. They are formed by a known thin-film deposition process, photo-lithography and an etching process. However, they differ from the conventional elements in their allocation on the substrate 1 as will be described later. Although it is not shown, a protection layer which is made of an insulation material such as $SiO_2$, $Al_2O_3$ or the like is formed over the substrate 1 in the same manner as the conventional head.

The medium sliding faces of the substrate 1 and the protection layer which is not shown are formed in an approximately elliptic spherical shape through a lapping process, etc.. In other words, the sliding face 10 is curved both in the track width direction Y and the medium sliding direction X. The positions of the conversion elements E1 to E4 on the substrate 1 are set at different heights in the direction of arrow Z as shown in the drawing in conformity to the curvature of the sliding face 10. In the case where a flexible rotating medium such as a magnetic disc is to be used, the radius of the arc of the sliding face in the direction of arrow Y is preferably set at 10 mm. The center of the curvature is preferably set on the center line 11 of the whole element arrangement.

Assuming that the conversion elements E1 to E4 are arranged at a pitch of 100 $\mu$m, the two middle elements E2 and E3 are positioned at the same height in the direction of arrow Z. The two side elements E1 and E4 are positioned at a height which is shifted and set back as much as $\Delta D$ from the position of the elements E2 and E3 in the direction of arrow Z. The setback degree $\Delta D$ is set at 1 $\mu$m in the case of the above-stated curvature setting in the direction of arrow Y.

Unlike the conventional arrangement, the above-stated arrangement permits the sliding face to be curved also in the direction of arrow Y without causing any decrease in the gap depth of the conversion elements located on the peripheral sides. The invented arrangement thus gives an excellent multi-track thin-film magnetic head which has a uniform characteristic for all the conversion elements. Further, as regards the medium sliding direction X, the head is arranged to have the same curved face as that of the conventional head. With the whole sliding face thus formed nearly in a spherical shape, an adequate head touch is obtainable. The magneto-electric/electro-magnetic conversion can be accomplished with a minimal spacing loss.

In the case of the embodiment described, the magnetic head is provided with four conversion elements for four tracks. The number of conversion elements, however, may be changed to three or five or more for the same structural arrangement as the one shown in FIG. 4. In case that the number of elements is six for six tracks with the radius of the curved face in the track width direction set at 10 mm and with the elements spaced at a pitch of 100 $\mu$m, the head is arranged as follows: Assuming that conversion elements E1 to E6 are aligned in the order of E1 to E6 from one end of the head, the elements E2 and E5 are shifted and set back in the direction of arrow Z as much as 1 μm from the middle elements E3 and E4 like in the case of FIG. 4. The end elements E1 and E6 are set back as much as 2 μm from the elements E2 and E5 further in the direction of arrow Z. With the conversion elements of the magnetic head allocated on the substrate in this manner in consideration of the sliding surface of the medium to be mounted, the characteristics of the conversion elements can be uniformized to give an excellent multi-track magnetic head. A greater amount of information thus can be transmitted at an increased speed.

The structural arrangement of the embodiment described is generalized as follows: With the curvature R (the radius of the curved face), the pitch of alignment of the conversion elements and the number of the elements decided, the positions of the elements can be determined irrespective as to how many elements are to be used. For example, in the case where the number of elements is an even number with the sliding face having a simple radius R in the direction of the element alignment (the track width direction), the intersection point of the sliding face and the center line of an element located in an i-th position from the center line of the head is shifted as much as a distance Di from the intersection point of center line of the whole head and the sliding face, as expressed by the following formula (1):

$$Di = R - \left[ R^2 - \left( (i-1)W + \frac{W}{2} \right)^2 \right]^{\frac{1}{2}} \quad (1)$$

Therefore, the shifting degree $\Delta Di$ from the i-th element in the direction of the head center line, of another element which is located in an (i+1)-th position relative to the center line of the head can be expressed by the following formula (2), wherein "i" is an integer which is at least 1:

$$\begin{aligned}
\Delta Di &= (Di + 1 - Di) \quad (2) \\
&= R - \left[ R^2 - \left( iW + \frac{W}{2} \right)^2 \right]^{\frac{1}{2}} - \\
&\quad R + \left[ R^2 - \left( (i-1)W + \frac{W}{2} \right)^2 \right]^{\frac{1}{2}} \\
&= \left[ R^2 - \left( (i-1)W + \frac{W}{2} \right)^2 \right]^{\frac{1}{2}} - \\
&\quad \left[ R^2 - \left( iW + \frac{W}{2} \right)^2 \right]^{\frac{1}{2}}
\end{aligned}$$

In the event of an odd number of elements, a j-th element located in a j-th position is shifted from the middle element in the direction of the head center line as much as a shifting degree Dj which can be expressed by the following formula (3):

$$Dj = R - [R^2 - (jW)^2]^{\frac{1}{2}} \quad (3)$$

Therefore, the shifting degree $\Delta Dj$ from the j-th element in the direction of the head center line, of another element located in a (j+1)-the position relative to the middle element can be expressed by the following formula (4), wherein "j" is an integer not less than 0:

$$\begin{aligned}
\Delta Dj &= (Dj + 1 - Dj) \quad (4) \\
&= R - [R^2 - \{(j+1)W\}^2]^{\frac{1}{2}} - R + [R^2 - (jW)^2]^{\frac{1}{2}} \\
&= [R^2 - (jW)^2]^{\frac{1}{2}} - [R^2 - \{(j+1)W\}^2]^{\frac{1}{2}}
\end{aligned}$$

Figure 5:
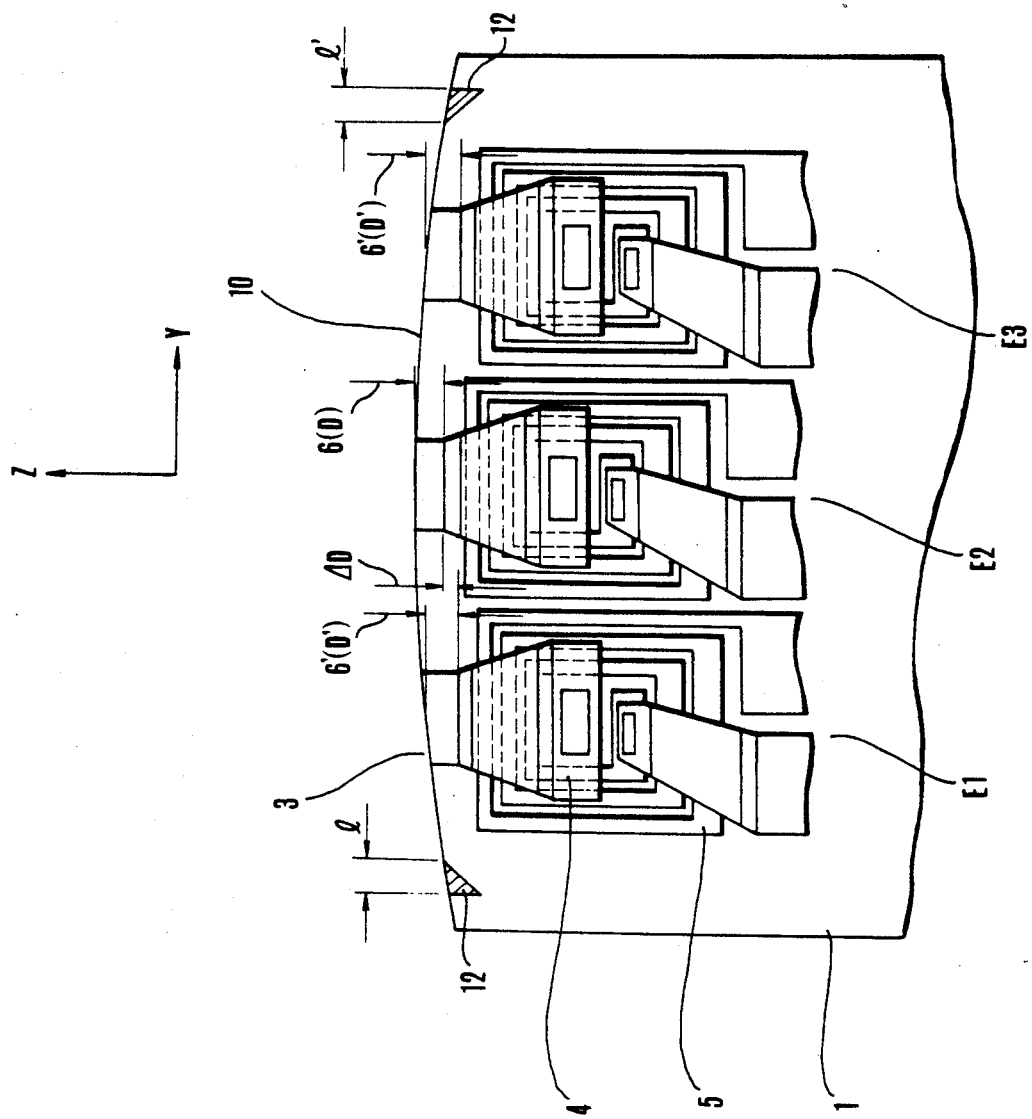
FIG. 5 shows the arrangement of conversion elements on a substrate of a thin-film magnetic head arranged according to this invention as another embodiment thereof.

FIG. 5 shows in a plan view the allocation of the conversion elements on the substrate of a thin-film magnetic head which is also arranged according to this invention as another embodiment thereof. In the case of FIG. 5, the substrate of the head has three conversion elements E1 to E3 disposed thereon for three tracks. Referring to FIG. 5, the side elements E1 and E3 are arranged in a state of being shifted and set back as much as ΔD from the middle element E2 in the direction of arrow Z in conformity to the shape of a sliding face 10.

Further, in forming a curved face in the direction of arrow Y after a reinforcement plate is formed, gap depth marks 12 which are in a triangular shape are provided at the two end parts of the substrate for a machining process to be performed on the sliding face in the manner suited for the above-stated arrangement of the conversion elements. The gap depth marks 12 are formed in the triangular shape with the same material as coils 5 during the process of forming the coils 5. The marks 12 permits measurement of widths 1 and 1' even after the reinforcement plate is formed. The triangular shape of the gap depth marks are as shown in FIG. 5.

Assuming that the gap depth of the middle conversion element E2 is D, that of the side conversion elements E1 and E3 is D', the elements and each depth mark 12 are arranged including a given setback degree according to the predetermined sliding face shape in such a way as to have a relation of D=D'=1=1'.

Therefore, in accordance with the above-stated arrangement, cutting work is performed in such a way as to make the widths 1 and 1' of the gap depth marks 12 which can be seen on the sliding face 10 equal to the gap depths D and D'. By this, the sliding face can be formed to have a curved face suited for the actual arrangement of the conversion elements.

Generally, the pressure of the air layer between the head and the medium depends on the area of the sliding contact surface of the recording medium. Therefore, in order to obtain an adequate conversion characteristic by restricting the space between the head and the medium, the area of the sliding face is preferably arranged to be a minimum necessary area. The area of the sliding face, therefore, cannot be arranged in general to leave a sufficient room for any purpose other than signal recording and reproduction. The gap depth marks enable easy and accurate measurement of the actual gap depth within a limited area without increasing the area of the sliding face. Further, the above-stated gap depth marks are located in furthermost positions from the center part of the head on both sides thereof, the widths 1 and 1' which can be seen on the sliding face are influenced to the greatest degree by the curvature of the sliding face. This ensures that the gap depth can be highly accurately controlled.

In the case of the embodiment described, the gap depth marks 12 are formed with the same metal film as the coils 5 when the coils 5 are formed. However, the marks 12 can be made of any other material as long as they can be seen on the sliding face. They may be made of, for example, the material of a gap layer or a magnetic layer. Further, in the foregoing description, the gap depth mark is arranged to permit detection of the actual gap depth currently obtained through the medium of its width which is either visible or measurable by some suitable optical measuring device. However, the mark of course may be replaced with any other gap depth mark that is arranged to have its electric conductivity, resistance or some other measurement value thereof change in proportion to the actual gap depth.

While electromagnetic inductive type elements having coils are employed as the electro-magnetic/magneto-electric conversion elements in each of the embodiments described in the foregoing, these conversion elements may be replaced with magnetoresistive elements (hereinafter referred to as MR elements). For example, it is known that a yoke type MR head has been developed. In the case of this yoke type MR head, instead of directly obtaining the signal of the magnetic medium, a magnetic gap and yoke are provided for catching a magnetic signal like the embodiment described; and magneto-electric/electro-magnetic conversion is accomplished with the MR element disposed within a magnetic path. In the yoke type MR head, a difference in efficiency between conversion elements is greatly affected by a dimensional discrepancy between one magnetic path and another. However, the invented arrangement to arrange the conversion elements according to the shape of the sliding face enables the magnetic head of this type to have a uniform conversion characteristics for all the tracks.

A multi-track vertical magnetic head which performs recording and reproduction of magnetization in the vertical direction of a recording medium can be arranged, like the embodiment described, to have the elements for tracks (such as main magnetic poles and coils) positioned according to the shape of the sliding face to obtain an adequate conversion characteristic for every track.

As described in the foregoing, a multi-track thin-film magnetic head which comprises a plurality of magneto-electric/electro-magnetic conversion elements formed on the substrate by the thin-film forming process and a medium sliding face machined to curve in the direction in which a plurality of tracks are aligned is arranged, in accordance with this invention, to have the the positions of the plurality of conversion elements on the substrate shifted from each other in the gap depth direction in conformity to the curved shape of the sliding face. The invented arrangement gives a desired conversion characteristic for every track. The multi-track thin-film magnetic head according to the invention thus excels in head touch characteristic for a rotating medium by virtue of the sliding face curved in the track width direction. The invented head, therefore, is capable of efficiently performing magneto-electric/electro-magnetic conversion without any spacing loss.

What is claimed is:

1. A multi-track head comprising:
   a) a substrate having a curved sliding face for sliding over a recording medium; and
   b) an n number of conversion elements formed on said substrate, "n" being an even number which is at least 4, positions of said n number of conversion elements being shifted from each other in a direction which is perpendicular to said curved sliding face, wherein said n number of conversion elements are aligned at a predetermined pitch W, and wherein, among said n number of conversion elements, the position of an element located in an i-th position relative to a center line of the head is shifted as much as a distance Di from another element located in an (i+1)-th position, where "i" represents an integer which is at least 1 and, with the radius of curvature of said sliding face expressed as R, the following relation being satisfied:

$$Di = [R^2 - \{(i-1)W + W/2\}^2]^{\frac{1}{2}} - (R^2 - \{iW + W/2\}^2)^{\frac{1}{2}}.$$

2. A multi-track head comprising:
   a) a substrate having a curved sliding face for sliding over a recording medium; and
   b) an n number of conversion elements formed on said substrate, "n" being and odd number which is at least 3, positions of said n number of conversion elements being shifted from each other in a direction which is perpendicular to said curved sliding face, wherein said n number of conversion elements are aligned at a predetermined pitch W, and wherein, among said n number of conversion elements, the position of an elements located in a j-th position relative to a center line of the head is shifted as much as a distance Dj from another element located in a (j+1)-th position, where "j" represents an integer not less than 0 and, with the radius of curvature of said sliding face expressed as R, the following relation being satisfied:

$$Dj = [R^2 - (jW)^2]^{\frac{1}{2}} - [R^2 - \{(j+1)W\}^2]^{\frac{1}{2}}.$$

3. A multi-track head comprising:
   a) a base-plate having a curved sliding face for sliding over a recording medium and a plane surface which is perpendicular to the sliding face; and
   b) an n number of electro-magnetic conversion elements formed on the plane surface of said base-plate, "n" being an integer which is at least 3, said conversion elements respectively including a core element, magnetic thin-films deposited on the plane surface and coil patterns, and positions of said n number of conversion elements being shifted from each other on the plane surface in a direction which is perpendicular to and away from said curved sliding face with at least a portion of at least one of said conversion elements being shifted a predetermined distance from said curved sliding face, which predetermined distance is different from the distance at which at least a portion of each of the other conversion elements is shifted from said curved sliding face, so that the ends of the cores of said n number of conversion elements align along said curved sliding face.

4. A head according to claim 3, wherein positions of said coil patterns of said "n" number of conversion elements are shifted from each other in the direction which is perpendicular to said curved sliding face according to the positions of said "n" number of conversion elements.

5. A head according to claim 3, wherein said base-plate is made of a magnetic material, wherein said n number of conversion elements respectively include magnetic thin-films which are opposed to said base-plate via magnetic gaps, and wherein positions of said magnetic thin-films are shifted from each other in the direction which is perpendicular to said curved sliding face according to the positions of said "n" number of conversion elements.

* * * * *